April 8, 1924.                                                1,489,260
G. B. LYNCH
MEANS FOR MOUNTING CIGAR LIGHTERS AND THE LIKE
Filed Nov. 18, 1922
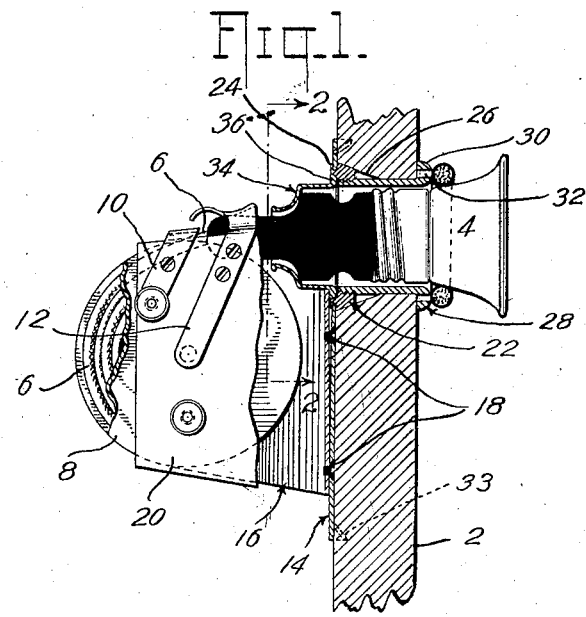
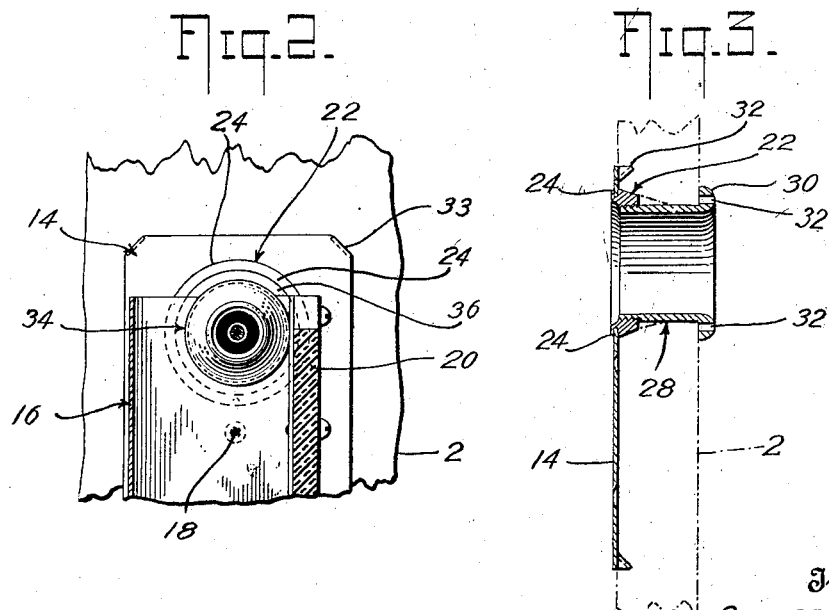
Inventor
GEORGE B. LYNCH.
By his Attorneys Patented Apr. 8, 1924.

1,489,260

UNITED STATES PATENT OFFICE.

GEORGE B. LYNCH, OF NEW YORK, N. Y., ASSIGNOR TO ELECTRIC AUTOMATIC CIGAR LIGHTER CO., OF NEW YORK, N. Y., A CORPORATION OF NEW JERSEY.

MEANS FOR MOUNTING CIGAR LIGHTERS AND THE LIKE.

Application filed November 18, 1922. Serial No. 601,691.

*To all whom it may concern:*

Be it known that I, GEORGE B. LYNCH, a citizen of the United States, residing at New York, county of New York, State of New York, have invented a certain new and useful Improvement in Means for Mounting Cigar Lighters and the like, of which the following is a full, clear, and exact description.

My invention relates to means for mounting cigar lighters and similar devices and has for its object to provide novel and improved means for mounting such devices on the instrument board of an automobile or other support.

The several features of the invention will be clearly understood from the following description and accompanying drawings, in which,—

Figure 1 is a side view, partly in section, of a cigar lighter having a mount embodying the features of the invention in their preferred form, the cigar lighter being shown applied to the instrument board of an automobile;

Fig. 2 is a sectional view, partly in elevation, taken on the line 2—2 of Fig. 1; and Fig. 3 is a detail vertical sectional view of component parts of the device with the instrument board shown by broken lines.

The cigar lighter illustrated in the drawings is shown applied to a supporting board 2 which may be the instrument board of an automobile. The cigar lighter comprises an electrical cigar lighting device in the form of a resistance carrier plug 4, an electric cord 6, a drum 8 on which the cord is adapted to be wound, and a spiral spring (not shown) associated with the drum whereby when the plug 4 is pulled outwardly the spring is wound up as the cord is drawn from the drum, and when the plug is released the drum is automatically rotated by the spring to wind up the cord. The plug 4 is in circuit with a suitable source of electrical supply through the cord 6. In the particular embodiment of lighter shown, the plug is provided with a circuit controlling projection, the circuit being opened and closed by switch contact members 10 and 12, the member 12 being raised from the member 10 by the projection on the plug when the plug is returned to retracted position and being permitted to reengage the member to close the circuit when the plug is drawn out.

The parts above referred to are similar to the corresponding parts of the cigar lighter illustrated and described in the patent to John G. Cook, No. 1,172,875, dated Feb. 22, 1916. By my invention automatic cigar lighters of that general rewinding cord type are provided with novel and improved means for enabling the lighter to be easily attached to the supporting board. As shown, the lighter is provided with a base consisting of a rectangular plate 14 of sheet metal to which is secured a U-shaped support 16 by means of screws 18. The drum 8 is mounted between the sides of the support 16. One of the sides and the bottom of the support 16 are made of sheet metal and are integral, and the other side of the support consists of a plate 20 of insulating material on which the switch members 10 and 12 are mounted.

The base plate 14 is provided with a circular aperture, to the rim of which is secured an annular bushing 22. The bushing is provided with a reduced rear end portion which is passed through the aperture in the base plate, and then its end is turned outwardly to form a flange 24 that cooperates with the shoulder at the forward end of said reduced portion to securely clamp the bushing to the base plate. The outer peripheral surface of the forward portion of the bushing 22 is tapering so as to fit the flaring rear end of the wall of an aperture 26 in the supporting board when the cigar lighter is applied to the board. The rear end of a thimble 28 is adapted to be passed through the aperture in the board and screw-threaded into the bushing 22. The thimble 28 is provided with a flange 30 on its forward end which, when the thimble is screwed into the bushing 22, cooperates therewith to securely clamp the rim of the aperture in the board between them. The flange 30 is provided with apertures 32 to enable a spanner wrench to be used in screwing the thimble into the bushing. To further secure the lighter to the supporting board, the corner portions of the base plate 14 are bent forwardly at right angles to provide prongs 33 which are forced into the supporting board when the device is applied to the board.

The thimble 28 constitutes a socket or receptacle for the reception of the plug 4, and in order to ensure the proper engagement of the inner projection on the plug with the switch member 12 when the plug is inserted, a guiding sleeve 34 for the end of the plug is arranged back of the thimble 28. The guiding sleeve 34 extends through an aperture in the bottom of the support 16 and its forward end is provided with a flange 36 which is clamped between the rims of the apertures in the support 16 and the bushing 22, the rear end of the bushing being flared outwardly so as to receive the flange.

From the foregoing it will be apparent that the cigar lighter may be easily attached to a support such as the instrument board of an automobile, and that when attached is rigidly held in place, and that it is secured without resorting to a face plate which is conspicuous upon the board. It also permits the lighter to be applied without cutting the board other than by boring a round hole of the proper size therein. Furthermore the outer end of the mounting always presents an inconspicuous and finished appearance. Moreover the external appearance is not dependent upon the thickness of the instrument board since with a given thimble and bushing there can be an adjustment for a considerable variation in thickness, on account of the telescoping of the screw-threaded portions, and where an instrument board has a thickness too great or too small for the length of a given thimble, another thimble of the proper length can be used.

As will be evident to those skilled in the art my invention permits of various modifications without departing from the spirit thereof or the scope of the appended claims.

What I claim is:

1. In a cigar lighter or similar device of the type having a drum, an electric cord adapted to be wound up on the drum, and an electrically operated device in the form of a plug connected with the outer end of the cord, the combination of a drum supporting base of sheet metal having outwardly turned prong portions adapted to be forced into the rear side of a supporting board to assist in securing said base to the board, a receptacle for said plug comprising an annular bushing secured to the rim of an aperture in the base and provided with a projecting portion having its outer surface tapering so as to fit a rearwardly flaring end portion of the wall of an aperture in the board when said base is in position, and a thimble having one end adapted to be passed through the aperture in the board and screw-threaded into said bushing, and having a flange adapted to engage the side of the board opposite to said base so as to cooperate with the bushing to clamp the board between them.

2. In a cigar lighter or similar device of the type having a drum, an electric cord adapted to be wound up on the drum, and an electrically operated device in the form of a plug connected with the outer end of the cord, the combination of a drum supporting base adapted to be mounted on the rear side of a supporting board, and a receptacle for said plug comprising an annular bushing secured to the rim of an aperture in the base, and a thimble having one end adapted to be passed through the aperture in the board and screw-threaded into said bushing, and having a clamping flange adapted to engage the side of the board opposite to said base.

3. In a cigar lighter or similar device of the type having a drum, an electric cord adapted to be wound up on the drum, and an electrically operated device in the form of a plug connected with the outer end of the cord, the combination of a drum supporting base of sheet metal having outwardly turned prong portions adapted to be forced into one side of a supporting board to assist in securing said base to the board and having an aperture adapted to register with an aperture in the board when the base is in position, and a receptacle for the plug comprising a thimble having one end adapted to be passed through the aperture in the base and having a clamping flange adapted to engage the side of the board opposite to said base, said thimble and base having a screw-threaded connection between them.

4. In a cigar lighter or similar device of the type having a drum, an electric cord adapted to be wound up on the drum, and an electrically operated device in the form of a plug connected with the outer end of the cord, the combination of a drum supporting base for application to the rear side of a supporting board, and a receptacle for said plug comprising an annular bushing secured to the rim of an aperture in said base and having a projecting portion having its outer surface tapering outwardly so as to fit a rearwardly flaring end portion of an aperture in the board when the base is in position, and a thimble having one end adapted to be passed through the aperture in the board and screw-threaded into said bushing and having a flange on its other end to cooperate with said bushing to clamp the board.

5. In a cigar lighter or similar device of the type having a drum, an electric cord adapted to be wound up on the drum, and an electrically operated device in the form of a plug connected to the outer end of the cord, the combination of a base portion adapted to be mounted on one side of a supporting board, a receptacle for said plug comprising an annular bushing secured to the rim of an aperture in said base portion, and a thimble having one end adapted to be passed through the aperture in the board and screw-threaded into said bushing and having a clamping flange adapted to engage the front side of the board, a second base portion constituting a support for the drum secured to said first base portion and having an aperture in alinement with said receptacle, and a guiding sleeve for the inner end of the plug secured to the rim of said aperture in alinement with the axis of said thimble and extending between said second base portion and said bushing.

GEORGE B. LYNCH.